United States Patent Office 2,824,145
Patented Feb. 18, 1958

2,824,145

CATALYTIC PROCESS FOR THE PREPARATION OF LONG CHAIN ALKYL AROMATIC COMPOUNDS

Marvin A. McCall and Harry W. Coover, Jr., Kingsport, Tenn., assignors to Eastman Kodak Company, Rochester, N. Y., a corporation of New Jersey No Drawing. Application December 14, 1955
Serial No. 552,990

15 Claims. (Cl. 260—671)

This invention relates to the preparation of long chain alkyl aromatic compounds and is particularly concerned with alkylating aromatic hydrocarbons of the benzene or naphthalene series by reaction of the aromatic hydrocarbon with a normally gaseous α-olefin in the presence of a particular catalyst combination.

The aromatic hydrocarbons containing long chain alkyl groups are usually oils or oily waxes which are commonly employed as plasticizers or as intermediates in the preparation of other compounds. For example, the long chain alkyl aromatic compounds can be nitrated to produce alkyl nitro aromatic compounds or sulfonated to produce materials which have good detergent or surface active properties. The sulfonation of alkyl benzenes, alkyl toluenes and the like is described in Ind. and Eng. Chem., 45, 2068 (1953), and the resulting sulfonated products are excellent detergents.

Heretofore, short chain alkyl groups could be introduced into the benzene by reacting the benzene with ethylene using a Friedel-Crafts type catalyst such as the halide of berryllium, boron, aluminum, titanium, zirconium, and the like, but the alkyl groups introduced into the aromatic compound by means of ethylene were simply ethyl groups, and the increasing alkylation merely amounted to introducing additional ethyl groups into additional positions on the ring. Thus, Grosse and Ipatieff (J. Org. Chem. I, 559—566 (1937)) showed that ethyl benzene, diethyl benzene, and similar ethylated benzenes up to hexaethyl benzene could be produced with the Friedel-Crafts type catalysts. This method did not yield alkyl chains on the nucleus longer than the olefins employed. The titanium tetrahalide was the poorest of this type of catalyst in effecting the alkylation reaction. Ordinarily, the long chain alkyl substituted aromatics were made by a two-step process wherein a long chain alkyl, alkene or alkyl halide was reacted with the aromatic hydrocarbon to introduce the desired group.

A large number of catalysts are known for producing liquid or solid olefin polymers, but the reaction did not ordinarily produce alkylated aromatic hydrocarbons even when the polymerization was carried out in solution in an aromatic vehicle. Thus, aluminum chloride, zinc chloride, sulfuric acid, boron trifluoride and ferric chloride have all been used for producing liquid olefin polymers. Furthermore, anhydrous aluminum chloride together with aluminum or zinc powder has been used for producing liquid olefin polymers. In addition, alkyl aluminum halides in combination with certain group IV–VI metal compounds have been employed for polymerizing ethylene to solid polyethylene even in the presence of aromatic hydrocarbons, as typified by Belgian Patent 534,792. None of these methods, however, were useful in preparing long chain alkyl substituted aromatic hydrocarbons.

It is therefore an object of this invention to provide a new and improved method for making long chain alkyl substituted aromatic hydrocarbons. It is another object of the invention to provide a method whereby normally gaseous α-olefins form long alkyl chains and alkylate aromatic hydrocarbons in a single reaction mixture in the presence of certain novel catalyst combinations as defined herein. Another object of the invention is to facilitate the commercial production of long chain alkylated aromatic compounds by direct alkylation with short chain olefins. Other objects will be apparent from the description and claims which follow.

These and other objects are attained by means of this invention wherein it was found that long chain alkyl substituted aromatic hydrocarbons could be readily prepared by reacting the aromatic hydrocarbon with an α-monoolefin in the presence of a catalytic mixture of a compound of the formula $R_mAlX_n$ wherein R is hydrogen, phenyl or an alkyl group of 1–12 carbon atoms, X is a halogen atom, and m and n are integers not greater than 2, one of the integers m and n always being 1 and the other always being 2, and a titanium halide containing at least 3 halogen atoms, provided the titanium halide is present in molar excess over the $R_mAlX_n$ compound. This result was wholly unexpected since ordinarily the combination of these two types of catalytic materials gave solid polyolefins rather than alkylating aromatic hydrocarbons when, as is usually the case, the aluminum containing compound is employed in excess and the titanium compound is employed as an activator. The reason why the catalyst mixtures containing a molar excess of the titanium halide over the aluminum compound gave long chain alkyl substituted aromatic hydrocarbons instead of the usual polyolefins is not understood at this time. It has been found, however, that when the molar ratio of the titanium halide to the alkyl aluminum halide or similar compound as defined is at least 1.05 to 1, the α-monoolefin alkylates the aromatic hydrocarbon to a substantial degree, although some polyolefin may be obtained at some low ratios. Generally speaking, the ratio of the titanium halide to the aluminum containing compound is in the ranges of from 1.05:1 to 20:1 in practicing the present invention. The formation of any substantial amount of polyolefin in admixture with the alkylated aromatic hydrocarbon can be largely obviated by employing the titanium halide in an amount of at least 2 moles for each mole of the $R_mAlX_n$ compound.

The alkylation reaction proceeds readily at room temperature or lower, although elevated temperatures can be used if desired. Since the reaction is exothermic, it is ordinarily not necessary to heat the reaction but merely to bring the reactants into contact in the presence of the catalyst and control the heat of the reaction or maintain the system in liquid phase. Conveniently, the reaction system can be pressured with the particular gaseous olefin being employed whereby the olefin dissolves in the reaction mixture as the reaction proceeds and also serves to maintain the reaction mixture in liquid state. The reaction can be carried out, however, at atmospheric pressure with the olefin dissolved in the reaction mixture, or at any desired pressure such as from 10 to 100 p. s. i. or higher if desired.

The process embodying the invention is applicable for alkylating any of the aromatic hydrocarbons, including either solid or liquid aromatic hydrocarbons, and particularly the hydrocarbons of the benzene and naphthalene series. The compounds of the benzene and naphthalene series can include the unsubstituted benzene or unsubstituted naphthalene, or the hydrocarbon substituted aromatic hydrocarbons such as toluene, xylene, ethylbenzene, diethylbenzene, naphthalenes containing short chain alkyl groups as substituents on the nucleus, and similar aromatic hydrocarbons. The nature of the aromatic hydrocarbon does not appear to affect the reaction provided the aromatic hydrocarbon has an open position for the alkylation to proceed. In the case of the normally liquid aromatic hydrocarbons, this material can form both a reactant and reaction vehicle. When a normally solid hydrocarbon is employed, an inert solvent such as heptane or the like can be used as solvent and reaction vehicle.

The compounds of the formula $R_m AlX_n$ are known to the art, and any of the compounds of this formula or mixtures of such compounds can be employed in practicing the invention. As has been indicated, R can be hydrogen whereby the compounds employed are aluminum chlorides or aluminum bromides. Desirably, R is an alkyl group of 1–12 carbon atoms and X is either chlorine or bromine. Thus, the monoalkyl aluminum dichlorides and dibromides or the dialkyl aluminum monochlorides or monobromides can be employed in the catalytic mixture of this invention with excellent results. The alkyl groups are desirably lower alkyl groups such as methyl, ethyl, propyl or butyl groups for convenience and economy, but the higher alkyl groups containing up to 12 carbon atoms such as hexyl, octyl, decyl and dodecyl can be employed with good yields of alkylated aromatics. Compounds which are particularly useful in practicing the invention are ethyl aluminum dichloride and dibromide, diethyl aluminum monochloride and monobromide, although the corresponding methyl, dimethyl, propyl, dipropyl, amyl, diamyl and similar compounds can be employed without seriously reducing the catalytic activity. The phenyl aluminum halides can also be used including phenyl aluminum dichloride or dibromide, as well as diphenyl aluminum monochloride or monobromide. In the preparation of the alkyl aluminum halides, the reaction product obtained ordinarily consists of a mixture of the monoalkyl aluminum dihalides and dialkyl aluminum monohalides, such as the alkyl aluminum sesquihalides. The activity of these mixtures is equal to that of the single compounds, and it is consequently not necessary to separate the components to give a single alkyl aluminum halide. Any of the aluminum containing compounds herein described can be employed with a molar excess of any of the titanium halides containing at least 3 halogen atoms. The titanium tetrahalides and particularly titanium tetrachloride or titanium tetrabromide are desirably employed in practicing the invention. The concentration of catalyst can be varied rather widely depending upon the reaction conditions such as temperature, pressure, concentration of olefin, type of aromatic hydrocarbon, and similar variable factors. Generally speaking, the catalyst will be used in a concentration of from about 0.1 to about 10% by weight of the aluminum containing compound based on the weight of the aromatic hydrocarbon being alkylated, although lower or higher concentrations can be employed. The titanium halide will, of course, be present in a molar excess over the aluminum containing compound and desirably present in at least twice the molar amount of the aluminum containing compound with amounts of 5, 10 or as much as 20 times as much titanium halide being desirably employed in some cases.

The invention is illustrated by the following examples of certain preferred embodiments thereof, although it will be understood that the examples are illustrative only and not intended to limit the scope of the invention unless otherwise specifically indicated.

*Example 1*

A mixture of 66 pounds of dry toluene and 77.24 g. (0.203 mole) of ethyl aluminum sesquibromide (which is essentially an equimolar mixture of ethyl aluminum dibromide and diethyl aluminum monobromide) was mixed with 80.6 g. (0.425 mole) of titanium tetrachloride with stirring under nitrogen in a glass-lined kettle. The resulting reaction mixture was then pressured with ethylene to 10 p. s. i. The temperature increased rapidly from room temperature to approximately 40° C. The temperature was held at 40° C. by extrenal cooling, and the pressure maintained at 10 p. s. i. for a total reaction time of 6 hours, during which time a total weight of approximately 11 pounds of ethylene was absorbed. The active catalyst was then destroyed by adding 2–5 gal. of ethyl alcohol to the reaction mixture. The mixture was then filtered, washed with water, dried and fractionated to give 9 pounds of oils boiling above 110° C. When these oils were oxidized with potassium permanganate, mixtures of phthalic acids were obtained showing that the products were disubstituted aromatic compounds. Infrared data on several fractions showed that the products were substituted toluenes corresponding generally to dodecyl toluene. The infrared data showed that all of the fractions boiling above toluene were very similar in structure and represented a family of alkyl substituted toluenes. Ebullioscopic molecular weight data indicated that the alkyl chain length ranged from $C_4$ to $C_{20}$, with the major components having a molecular weight indicative of a chain length in the $C_8$ to $C_{12}$ range. A small proportion was in the semisolid range and was not fractionated but was identified as a substituted toluene. Under reaction conditions herein employed wherein the titanium tetrahalide amounted to twice the molar amount of the ethyl aluminum sesquibromide, no solid polyethylene was obtained as would be expected from methods known to the art wherein ethyl aluminum sesquibromide used in molar excess over titanium tetrachloride was used for forming polyethylene.

*Example 2*

The procedure described in the preceding example was duplicated using as the catalyst mixture 49.5 g. (0.2 mole) of ethyl aluminum sesquichloride and 76.2 g. (0.4 mole) of titanium tetrachloride. The results obtained were essentially the same as described in the preceding example whereby it can be seen that the titanium chlorides and alkyl aluminum chlorides are equally as effective as the corresponding bromides.

*Example 3*

As has been indicated, it is necessary to employ a molar excess of the titanium halide over the aluminum compound in order to achieve the results embodying the present invention. This is illustrated by the following examples wherein the procedures and conditions described in Example 1 were followed except that the molar ratio of ethyl aluminum sesquibromide to titanium tetrachloride was modified.

(A) A mixture of 76.2 g. (0.2 mole) of aluminum sesquibromide and 37.9 g. (0.2 mole) of titanium tetrachloride was employed as the catalyst, the molar ratio being 1:1. In this case, the product was a solid polyethylene having a melt index of 2.0 and little or no alkylated aromatic hydrocarbon was obtained. It is thus apparent that the molar ratio of the catalyst components is critical and that the change from a molar excess of the aluminum containing compound to a molar excess of the titanium halide completely reverses the course of the reaction.

(B) A catalytic mixture of 18.97 g. (0.1 mole) of titanium tetrachloride and 76.2 g. (0.2 mole) of ethyl aluminum sesquibromide was used in the procedure of Example 1, the molar ratio of ethyl aluminum sesquibromide to titanium tetrachloride being 2:1. In this case the product was a solid polyethylene having a melt index of 0.16, and no oils were obtained.

(C) When a catalyst mixture of 76.2 g. (0.2 mole) of ethyl aluminum sesquibromide and 47.42 g. (0.25 mole) of titanium tetrachloride was employed whereby the ratio of aluminum compound to titanium compound was 1:1.25, the product obtained consisted of approximately 5 pounds of solid polyethylene having a melt index of 13.0 and 2 pounds of a mixture of alkyl substituted toluenes boiling above the toluene itself. It can thus be seen that the change in ratio of the catalyst components to give an excess of the titanium halide resulted in substantial formation of the alkyl substituted toluene.

(D) The alkylation of the aromatic hydrocarbons becomes apparent as soon as the titanium halide is in excess over the aluminum containing compound. Thus, the process of Example 1 was followed using a catalyst mixture consisting of 76.2 g. (0.2 mole) of ethyl aluminum sesquibromide and 39.84 g. (0.21 mole) of titanium tetrachloride to give a molar ratio of 1:1.05. The product obtained consisted of about 8 pounds of solid polyethylene having a melt index of 6.5 and approximately 1.5 pounds of a mixture of alkyl substituted toluenes.

*Example 4*

The alkylation method embodying the invention can be employed for alkylating any of the well known aromatic hydrocarbons. Thus, 66 pounds of dry benzene was reacted with ethylene under 10 pounds pressure at 40° C. in the presence of 77.24 g. of ethyl aluminum sesquibromide and 80.6 g. of titanium tetrachloride (a molar ratio of 1:2). The product obtained after 6 hours consisted of 10 pounds of oils boiling above 80° C. from a total absorption of 13 pounds of ethylene. The infrared data indicated that the product was predominantly dodecyl benzene, which boils at 125–129° C. at 1 mm. pressure. Fractions were also obtained which by infrared analysis corresponded to 7-phenyl tridecane, 2-phenyl octane and 9-phenyl heptadecane. Only a very small amount of semisolid material was obtained. The molecular weight determination on the major components indicated alkyl chain lengths of 8 to 16 carbon atoms.

*Example 5*

Although ethylene is conveniently employed as the olefin for alkylation, any of the common olefins containing 2–10 carbon atoms can be employed, including either the straight or branched chain olefins. Thus, 98 ml. of dry toluene, 0.5 g. (0.0013 mole) of ethyl aluminum susquibromide and 0.49 g. (0.0026 mole) of titanium tetrachloride were combined under nitrogen in a pressure reactor. The reactor was then pressured with propylene to 10 p. s. i., and a propylene pressure of 10 p. s. i. was maintained for 8 hours. The reaction product had a total volume of 173 ml., which represents a volume increase of approximately 73 ml. The active catalyst residues were destroyed with 10 ml. of methanol, and the product was then washed with water, dried over anhydrous magnesium sulfate, and fractionally distilled to give 70 g. of oil boiling above 110° C. Infrared spectra indicated the product to be very similar but not identical to the product obtained in Example 1. Oxidation data indicated the product to be a substituted toluene, and the molecular weight data showed that the long chain alkyl groups attached to the toluene nuclei ranged from $C_6$ to $C_{24}$. Similar results were obtained using either ethyl aluminum dibromide or diethyl aluminum monobromide in place of the ethyl aluminum sesquibromide mixture described above. The molar quantity of titanium tetrachloride was held constant. The results in all cases were substantially identical, and no advantage was gained by separating the components of the ethyl aluminum sesquibromide mixture.

*Example 6*

Propylene at 10 p. s. i. was reacted with benzene using a catalyst mixture consisting of ethyl aluminum sesquibromide together with twice the molar amount of titanium tetrabromide according to the procedure of the preceding example. The total volume of product was 150 ml. representing a volume increase of approximately 50 ml. The reaction product was separated from unreacted benzene by fractionation, and approximately 60 g. of oil boiling above 80° C. was obtained. Infrared data indicated the product consisted of alkyl substituted benzenes, and this was confirmed by oxidation of the products to benzoic acid. The molecular weight data indicated that the alkyl groups ranged in length from $C_6$ to $C_{30}$ and that the major fractions were the $C_{12}$ and $C_{18}$ alkylated benzenes.

*Example 7*

The process embodying the invention is equally as applicable to members of the naphthalene series as to members of the benzene series. Thus, a concentrated solution of 98 g. of naphthalene in heptane was alkylated as described in Example 5. A small amount of solid material was obtained, but the major portion of the product consisted of viscous oils which were identified as alkyl substituted naphthalenes.

*Example 8*

A mixture of 98 ml. of dry toluene, 1 g. (0.0026 mole) of ethyl aluminum sesquibromide, and 0.98 g. (0.0056 mole) of titanium tetrachloride was pressured with 10 p. s. i. of isobutylene. The resulting reaction mixture was shaken for 8 hours at 8–10 p. s. i. isobutylene pressure. The reaction product had a total volume of 200 ml., which represented a volume increase of approximately 100 ml. The active catalyst residues were destroyed with 10 ml. of methanol. The product was filtered, washed with water and dried over anhydrous magnesium sulfate. The yield of alkyl substituted toluenes boiling above 110° C. was 80 g. There was also obtained 10 g. of a fraction having an index of refraction of 1.4333 and a boiling point of 76.5° C. at 40 mm. pressure, which was free of toluene and which was identified as an aliphatic compound with nonconjugated unsaturation with the isobutene functional group appearing as the major component. In the same manner alkylated hydrocarbon oils were obtained using 1-butene and 1-pentene with the different catalysts and different aromatic hydrocarbons described hereinabove.

*Example 9*

The critical nature of the ratio of catalyst components has been illustrated in the preceding examples. The unique nature of the catalyst combination was shown by the fact that the procedure of Example 5 was followed using 0.5 g. of ethyl aluminum sesquibromide as the sole catalyst. The reaction mixture was pressured with 10 p. s. i. propylene, but no absorption was observed. After being shaken for 8 hours, the mixture was worked up as described in Example 5, but no material other than toluene was obtained. It was thus apparent that the alkylation could not be achieved under these conditions in the absence of the titanium halide. The same procedure was then followed using 0.49 g. of titanium tetrachloride as the sole catalyst. As in the case of the aluminum compound alone, no material other than toluene was obtained from the reactor. In contrast to this, excellent results were obtained with various catalyst combinations as described herein including such catalysts as titanium tetrachloride or tetrabromide combined with methyl aluminum dibromide, dimethyl aluminum monobromide, methyl aluminum sesquichloride, hexyl aluminum sesquibromide, and dodecyl aluminum sesquibromide.

Thus by means of this invention the direct preparation of long chain alkyl substituted aromatic hydrocarbons from olefins and the aromatic hydrocarbon to be alkylated is readily attained in good yield. The catalysts employed are readily obtainable, and the procedure can be varied rather widely without greatly affecting the results provided the titanium halide is employed in molar excess over the aluminum containing compound. The invention is applicable for preparing a large variety of alkylated aromatic hydrocarbons which, although known to the art, and employed for various uses such as plasticizers, could not be obtained by direct methods heretofore.

The invention has been described in considerable detail with particular reference to certain preferred embodiments thereof, but it will be understood that variations and modifications can be effected within the spirit and scope of the invention as described hereinabove and as defined in the appended claims.

We claim:

1. The method of producing a long chain alkyl aromatic hydrocarbon which comprises reacting an aromatic hydrocarbon with an α-monoolefin in the presence of a catalytic mixture of a compound of the formula $R_mAlX_n$ wherein R is a member of the group consisting of hydrogen, phenyl and alkyl groups of 1-12 carbon atoms, X is a halogen atom, and $m$ and $n$ are integers not greater than 2, one of the integers $m$ and $n$ always being 1 and the other always being 2, and a titanium halide containing at least three halogen atoms, said titanium halide being present in molar excess over said $R_mAlX_n$ compound.

2. The method of producing a long chain alkyl aromatic hydrocarbon which comprises reacting an aromatic hydrocarbon with an α-monoolefinic hydrocarbon containing 2-10 carbon atoms in the presence of a catalytic mixture of a monoalkyl aluminum dihalide wherein the alkyl group contains 1-12 carbon atoms and a titanium tetrahalide, the molar ratio of said titanium tetrahalide to said monoalkyl aluminum dihalide being at least 1.05:1.

3. The method of producing a long chain alkyl aromatic hydrocarbon which comprises reacting an aromatic hydrocarbon with an α-monoolefinic hydrocarbon containing 2-10 carbon atoms in the presence of a catalytic mixture of a dialkyl aluminum monohalide wherein each group contains 1-12 carbon atoms and a titanium tetrahalide, the molar ratio of said dialkyl aluminum monohalide being at least 1.05:1.

4. The method of producing a long chain alkyl aromatic hydrocarbon which comprises reacting an aromatic hydrocarbon of the benzene series with an α-monoolefinic hydrocarbon containing 2-10 carbon atoms in the presence of an alkyl aluminum halide wherein each alkyl group contains 1-12 carbon atoms and a titanium halide containing at least three halogen atoms, the molar ratio of said titanium halide to said alkyl aluminum halide being at least 1.05:1.

5. The method of producing a long chain alkyl aromatic hydrocarbon which comprises reacting an aromatic hydrocarbon of the naphthalene series with an α-monoolefinic hydrocarbon containing 2-10 carbon atoms in the presence of an alkyl aluminum halide wherein each alkyl group contains 1-12 carbon atoms and a titanium halide containing at least three halogen atoms, the molar ratio of said titanium halide to said alkyl aluminum halide being at least 1.05:1.

6. The method of producing a long chain alkyl benzene which comprises reacting benzene with an α-monoolefinic hydrocarbon containing 2-10 carbon atoms in the presence of alkyl aluminum halide consisting predominantly of monoalkyl aluminum dihalide wherein each alkyl group contains 1-12 carbon atoms and titanium tetrahalide, the molar ratio of said titanium tetrahalide to said alkyl aluminum halide being at least 1.05:1.

7. The method of producing a long chain alkyl benzene which comprises reacting benzene with an α-monoolefinic hydrocarbon containing 2-10 carbon atoms in the presence of alkyl aluminum halide consisting predominantly of dialkyl aluminum monohalide wherein each alkyl group contains 1-12 carbon atoms and titanium tetrahalide, the molar ratio of said titanium tetrahalide to said alkyl aluminum halide being at least 1.05:1.

8. The method of producing a long chain alkyl toluene which comprises reacting toluene with an α-monoolefinic hydrocarbon containing 2-10 carbon atoms in the presence of alkyl aluminum halide consisting predominantly of monoalkyl aluminum dihalide wherein each alkyl group contains 1-12 carbon atoms and titanium tetrahalide, the molar ratio of said titanium tetrahalide to said alkyl aluminum halide being at least 1.05:1.

9. The method of producing a long chain alkyl toluene which comprises reacting toluene with an α-monoolefinic hydrocarbon containing 2-10 carbon atoms in the presence of alkyl aluminum halide consisting predominantly of dialkyl aluminum monohalide wherein each alkyl group contains 1-12 carbon atoms and titanium tetrahalide, the molar ratio of said titanium tetrahalide to said alkyl aluminum halide being at least 1.05:1.

10. The method of producing a long chain alkyl aromatic hydrocarbon which comprises reacting an aromatic hydrocarbon with an α-monoolefinic hydrocarbon containing 2-10 carbon atoms in the presence of a mixture of monoalkyl aluminum dihalide and dialkyl aluminum monohalide wherein each alkyl group contains 1-12 carbon atoms, and a titanium tetrahalide, the molar ratio of said titanium tetrahalide to the alkyl aluminum halides being at least 1.05:1.

11. The method of producing a long chain alkyl toluene which comprises reacting toluene with ethylene in the presence of ethyl aluminum sesquibromide and titanium tetrachloride, the molar ratio of said titanium tetrachloride to said ethyl aluminum sesquibromide being in the range of from 1.05:1 to 20:1.

12. The method of producing a long chain alkyl benzene which comprises reacting benzene with ethylene in the presence of ethyl aluminum sesquibromide and titanium tetrachloride, the molar ratio of said titanium tetrachloride to said ethyl aluminum sesquibromide being in the range of from 1.05:1 to 20:1.

13. The method of producing a long chain alkyl toluene which comprises reacting toluene with ethylene in the presence of ethyl aluminum sesquichloride and titanium tetrachloride, the molar ratio of said titanium tetrachloride to said ethyl aluminum sesquichloride being in the range of from 1.05:1 to 20:1.

14. The method of producing a long chain alkyl benzene which comprises reacting benzene with ethylene in the presence of ethyl aluminum sesquichloride and titanium tetrachloride, the molar ratio of said titanium tetrachloride to said ethyl aluminum sesquichloride being in the range of from 1.05:1 to 20:1.

15. The method of producing a long chain alkyl toluene which comprises reacting toluene with ethylene in the presence of ethyl aluminum sesquibromide and titanium tetrabromide, the molar ratio of said titanium tetrabromide to said ethyl aluminum sesquibromide being at least 1.05:1.

References Cited in the file of this patent

UNITED STATES PATENTS

| 2,057,432 | Ipatieff et al. | Oct. 13, 1936 |
| 2,348,701 | Schmerling | May 9, 1944 |
| 2,388,428 | Mavity | Nov. 6, 1945 |
| 2,440,498 | Young et al. | Apr. 27, 1948 |
| 2,683,760 | McCaulay et al. | July 13, 1954 |
| 2,721,189 | Anderson et al. | Oct. 18, 1955 |
| 2,772,244 | Shalit et al. | Nov. 27, 1956 |

OTHER REFERENCES

Grosse et al.: Jour. of Organic Chemistry, vol. 2, 1937, pp. 559–566.